3,764,477
RESIN-BOUND, PROTEIN-LIKE ACTIVE AGENTS PREPARED BY REACTING A PROTEIN WITH A WATER INSOLUBLE POLYMER OF ACRYLIC OR METHACRYLIC ACID ANHYDRIDE
Klaus Lehmann and Apollonio Conte, Darmstadt, Germany, assignors to Rohm GmbH, Darmstadt, Germany
No Drawing. Continuation-in-part of abandoned application Ser. No. 785,382, Dec. 19, 1968. This application May 12, 1971, Ser. No. 142,805
Claims priority, application Germany, Dec. 27, 1967, P 16 95 662.0
Int. Cl. C07g 7/02; C08f 37/08; C12k 1/00
U.S. Cl. 195—63                    10 Claims

ABSTRACT OF THE DISCLOSURE

A water-insoluble biologically-active material comprising a proteinaceous biologically-active agent covalently bound to a water-insoluble polymer of acrylic anhydride or methacrylic anhydride. Method for making said material by contacting said biologically-active agent and polymer.

---

This application is a continuation-in-part of copending application Ser. No. 785,382 filed Dec. 19, 1968, now abandoned.

The present invention relates to methods for covalently bonding proteinaceous biologically active agents to a polymer having anhydride groups, and to the biologically active materials so obtained.

It is known in the art to bind enzymes to water-insoluble carrier substances, with retention of the biological activity of the enzymes, and to carry out specific degradation reactions with such products. To a certain degree, this manner of using biologically active protein derivatives imitates processes in living tissue in which the same or related active agents are bound to cell structures or are embedded in cell membranes and in this quasi-insoluble form catalyze biochemical processes.

The bonding of a biologically active protein-like active agent to a substrate-insoluble carrier can be adsorptive or covalent. Since a physically adsorbed protein in aqueous suspension is always in equilibrium with dissolved protein, an undesired desorption under conditions of use often cannot be avoided. Therefore, the covalent bonding of biologically active materials to a water-insoluble carrier is to be preferred: the active agent is not eluted from such a complex.

The bonding of biologically active proteins or of protein-like agents onto the carrier substance takes place by way of functional groups of the protein body which are unnecessary for its activity. These active groups can be terminal-amino or epsilon-amino groups, carboxyl groups, sulfhydryl or hydroxy groups, or groups such as the phenol group of tyrosine or the imidazole group of histidine.

Natural or synthetic macromolecular substances which have reactive groups coordinated with the groups named above are known as carriers. Carboxymethyl cellulose, diazotized p-aminobenzyl cellulose, polystyrene, diazotized polyaminostyrene, poly-4-isocyanate styrene, and a nitrated copolymer of methacrylic acid and methacrylic acid-3-fluoranilide (molar ratio 3:1) can be cited as examples of such carriers. If these substances are water-soluble, they can be employed in the form of cross-linked products.

The object of the present invention is the bonding of protein-like active agents onto a synthetic resin containing anhydride groups. The present state of the art in the field of the invention can be described in greater detail. Levin, Pecht, Goldstein, and Katchalsky describe the preparation of a water-insoluble trypsin-synthetic resin in Biochemistry, 3 (12), 1905–1913 (1964) [abstracted in Chemical Abstracts, 62, 4260 (1965)]. According to the article, trypsin is coupled with a copolymer of maleic acid anhydride and ethylene which has been cross-linked with hexamethylene diamine. Free anhydride groups are subsequently hydrolyzed. However, the sensitivity of this copolymer to hydrolysis is so considerable that even during the attachment of the enzyme to the resin a portion of the anhydride groups are hydrolyzed. These, thus, are no longer available as reactive groups for covalent bonding with the protein. In addition, research has shown that a long time (about 20 hours) is required for fixation of the enzyme to the carrier, so that the losses of reactive anhydride groups are particularly large. Further, the trypsin-resin obtained must be washed for a long time to free it from by-products containing a portion of the enzyme in inactive form. The yields of trypsin-resin, calculated on the amount of enzyme employed, vary over wide limits (22–65 percent), so that the bonding of the protein to the anhydride groups of this copolymer must be regarded as relatively unspecific.

U.S. Pat. 3,252,948 to Manecke et al. describes the bonding of proteinaceous biologically-active materials to copolymeric carriers comprising 2,4 - dinitro - 5 - fluorophenyl groups as the essential protein-reactive groups thereon. The preparation of such carriers is complex and costly. Thus, for example, a comonomer such as m-fluorophenyl methacrylamide, preferred by Manecke et al., is first copolymerized with one or more monomers to form a copolymer. The copolymer is then nitrated at ice temperatures with an aqueous mixture of nitric and sulfuric acids. The nitration step, in addition to its cost in time and materials, may also affect other groups present in the copolymer. Thus, acrylic anhydride or methacrylic anhydride groups, if present in such a copolymer, would be hydrolyzed during the treatment.

It has now been found that protein-like active agents such as enzymes, enzyme inhibitors, antigens, and antibodies, insofar as these agents have a reactive $\alpha$-amino group or epsilon-amino group, can be easily and practically completely bound to homopolymers and copolymers of acrylic acid anhydride or methacrylic acid anhydride with retention of their biological activity. The polymeric carriers of the present invention, containing anhydride groups are free of dinitro-fluorophenyl groups like those taught in the Manecke et al. patent.

To the extent that the macromolecular compounds useful in the present invention may be water-soluble, they are first converted by way of cross-linking reactions known in the art into products which can still be swollen but which nevertheless are water-insoluble. Cross-linking can be achieved by a supplementary treatment of the copolymer with a polyamine, such as a diamine, or with other polyfunctional compounds such as polyols. The same kind of cross-linking mechanism is here involved as is known for the reaction of the homopolymers or copolymers mentioned with other polyfunctional, i.e. bifunctional, compounds whose reactive groups react with anhydride groups. Ethylene diamine, hexamethylene diamine, propylene diamine, 2,3-diamino propanol, thioethyl amine, and polyethylene glycol can be mentioned as examples of cross-linking agents. It should be pointed out that cross-linking can take place simultaneously with the bonding of certain proteinaceous active agents if two or more groups of the latter react with the resin.

Alternatively, cross-linking can be effected by preparing anhydride copolymers with comonomers having at least two polymerizable carbon-carbon double bonds in their molecule.

Cross-linking comonomers, which may be employed in amounts of from 0.1 to 5 percent of the total weight of resin, include, for example, vinyl acrylate, vinyl methacrylate, allyl acrylate, allyl methacrylate, divinyl benzene, ethylene glycol diacrylate and dimethacrylate, and triallyl cyanurate.

The cross-linking of copolymers of acrylic acid anhydride or of methacrylic acid anhydride is not necessary in those cases in which water-insolubility of the resin is brought about by the presence of a mono-unsaturated hydrophobic comonomer or comonomers. The extent to which an anhydride or a mixture of the anhydrides mentioned can be present in such a copolymer can vary over wide limits. In general, in addition to cross-linked homopolymers, copolymers having an anhydride content of 1 weight percent or more can be employed as carriers according to the present invention.

As mono-unsaturated hydrophobic comonomers for methacrylic acid anhydride and acrylic acid anhydride, vinyl and vinylidene compounds such as the esters, amides, and nitriles of acrylic, methacrylic, itaconic, and crotonic acids, as well as styrene and vinyl acetate, are of principal importance. Copolymers of this type are described inter ali by Hwa and Miller in the Journal of Polymer Science, 55, 197–213 (1961).

The homopolymers and copolymers mentioned can be prepared as bulk, emulsion, suspension, or solution polymers. Dispersion and solution polymers must be coagulated or precipitated. The precipitation of solution polymers can be brought about by supplementary reaction with a cross-linking agent. Dispersions are suitably coagulated in a manner known in the art, dried, and employed in coarsely dispersed form.

In many cases it can be of advantage to bond proteinaceous compounds to the dispersed polymer particles and then to use these dispersions directly. Optionally, the dispersions may be coagulated while observing suitable precautions, and the coagulate isolated and dried.

The bonding of proteinaceous active agents to the polymers employed according to the present invention as a rule takes place by stirring the suitably subdivided carriers into an aqueous solution of the active agent to be combined therewith at ice temperatures, at room temperature, or at slightly elevated temperatures not harmful to the protein, and then separating the liquid phase. As shown in the following specific examples, a quick and complete bonding of the active agent to the carrier takes place in a relatively short time with maintenance of a suitable ratio between the anhydride groups and protein.

All proteinaceous biologically active agents having an $\alpha$- or epsilon-amino group can be combined with polymers and copolymers of the type described. Exemplary enzymes of this kind are trypsin, chymotrypsin, papain, insulin, urease, catalase, ribonuclease, streptokinase, diastase, and pectinase. Oxytocin, vasopressin, hypertensin, and adrenocorticotropic hormone (ACTH) can be mentioned as examples of polypeptides. Antibodies and a variety of antigens also belong to the proteinaceous compounds which can be bound to the carriers of the present invention, so that these also may be specifically separated from substances which naturally accompany them with the aid of the macromolecular compounds in question. For example, it is possible to isolate antibodies from serum by binding an appropriate antigen to a polymer or copolymer according to the present invention, and then contacting the "antigen-resin" obtained in this manner with the serum containing antibodies. The antibodies can be separated from the complex produced in this manner in a simple fashion, for example by elution with an aqueous solution at a suitable pH value. The "antigen-resin" can be used for the isolation of further antibodies.

The following examples illustrate the present invention without limiting it to the specific embodiments described.

EXAMPLE 1

107.4 g. of freshly distilled methacrylic acid anhydride were mixed with one liter of water-free benzene. 1.07 g. of benzoyl peroxide were added with stirring. The mixture was stirred for twelve hours at 65° C. under a nitrogen atmosphere in a flask having a condenser and thermometer. The product precipitating on cooling was vacuum-filtered, washed with benzene, and dried for 10 hours at 45° C. Yield: 107 g. of polymethacrylic acid anhydride.

5 g. of polymethacrylic acid anhydride were suspended in a mixture of 150 ml. of water and 10 ml. of methanol. 50 ml. of a 0.5 percent aqueous solution of hexamethylene diamine were added dropwise over a period of ten minutes at room temperature with stirring. The reaction mixture was stirred for a further 15 minutes after which the reaction product was filtered off, washed with 50 percent methanol, and dried in vacuum. Yield: 5.9 g. of cross-linked polymethacrylic acid anhydride.

3 g. of the cross-linked polymethacrylic acid anhydride prepared in this fashion were suspended in a solution of 0.48 g. of crystalline trypsin in 30 ml. of water and stirred for three hours at room temperature. The mixture was then centrifuged, the precipitate washed several times with water, and finally dried at 0° C. in vacuum. Yield: 3.36 g. of "trypsin-resin," or 96.5 percent of theory. The protein content was 13 percent. The specific activity of the bound enzyme protein toward N-benzoylarginine-p-nitranilide at pH 8.0 was 30 percent of the specific activity of the unbound crystalline trypsin employed as starting material.

EXAMPLE 2

61.6 g. of methacrylic acid anhydride in 640 ml. of water-free benzene were combined with 0.6 g. of divinyl benzene and 0.64 g. of benzoyl peroxide and polymerized and worked up as in Example 1. Yield: 48 g. of cross-linked polymethacrylic acid anhydride.

1.54 g. of the product prepared in this manner were then suspended in 50 milliliters of ethanol and partially hydrolyzed by the addition of 1.47 g. of 25 percent ammonia solution. After 15 minutes, the reaction product was filtered off, washed with ethanol and ether, dried, and suspended in a tenfold amount by weight of a 1.6 percent aqueous solution of crystalline $\alpha$-chymotrypsin. The mixture was now stirred for three hours at room temperature and centrifuged, and the precipitate was washed several times with water and dried at 0° C. in vacuum. Yield: 0.95 g. of "chymotrypsin-resin" per gram of partially hydrolyzed polymethacrylic acid anhydride, i.e. 82 percent of theory. The protein content was 14 percent. The specific activity of the bound protein toward carboxypropionylalanine-p-nitranilide at pH 8 was 75 percent of the specific activity of the unbound crystalline $\alpha$-chymotrypsin starting material.

EXAMPLE 3

150 g. of a mixture comprising 5 percent by weight of methacrylic acid anhydride, 30 percent of methacrylamide, 60 percent of methacrylic acid, and 5 percent of ethylene glycol dimethacrylate were polymerized in 750 ml. of ethyl acetate over a period of 2½ hours at 75° C. in a CO$_2$-stream using 1.5 g. of azoisobutyrodinitrile. The precipitation product was vacuum-filtered, washed with ethyl acetate, and dried in vacuum. Yield: 145 g. of copolymer.

1.0 g. of the copolymer prepared in this manner were suspended in 10 ml. of an aqueous solution of 0.18 g. of a pancreas preparation (enzyme content about 17 percent trypsin and 11 percent chymotrypsin) and stirred for three hours at room temperature. The mixture was then centrifuged; the precipitate was washed several times with water and finally dried at 0° C. in vacuum. Yield: 1.06 g., i.e. 90 percent of theory. The protein content was 7 percent. The total activity of the enzyme bound to the resin toward N-benzoylarginine-p-nitranilide at pH 8 was 44 percent of the enzyme activity of the starting material.

EXAMPLE 4

100 g. of a mixture of 10 percent by weight methacrylic acid anhydride and 90 percent of methyl methacrylate were polymerized for 12 hours at 65° C. in 1 liter of benzene using 1.0 g. of benzoyl peroxide.

100 mg. of the water-insoluble copolymer prepared in this manner were stirred for 24 hours, with ice-cooling, with 25 mg. of a trypsin-inhibitor obtained from the pancreas of cattle (commercially available under the trade name "Trasylol") in 20 ml. of a 0.2 M phosphate buffer at pH 7.5. The material was then centrifuged, washed free of phosphate, and lyophilized. The yield was 115 mg.

EXAMPLE 5

80 mg. of polymethacrylic acid anhydride cross-linked with propylene diamine as described in Example 1 were suspended in a solution of 40 mg. of crystalline papain in 1 ml. of 0.05 M phosphate buffer (pH 7.5) and stirred for 4 hours at room temperature under nitrogen. The reaction product was worked up as in the previous examples and dried. Yield: 91 mg. of "papain resin," i.e. 78 percent of theory. The protein content was 28 percent. The specific activity of the bound enzyme protein toward N-benzoylarginine-p-nitranilide at pH 8 was 31 percent of the specific activity of the unbound crystalline papain starting material.

EXAMPLE 6

A copolymer comprising 97 percent by weight of methacrylic acid anhydride and 3 percent of ethylene glycol dimethacrylate was prepared by a precipitation polymerization process like that of Example 1. 1 gram of this product was stirred for 24 hours at room temperature with 100 mg. of Val$^5$-angiotensin-II-amide (commercially available under the trade name "Hypertensin") in 200 ml. of a 0.2 M phosphate buffer at 7.5. The mixture was then centrifuged, washed free of phosphate, and lyophilized. The yield was 90 mg.

EXAMPLE 7

A copolymer comprising 10 percent by weight of acrylic acid anhydride, 25 percent of ethylene glycol monomethacrylate, 30 percent of styrene, 30 percent of methyl methacrylate, and 5 percent of ethylene glycol dimethacrylate was prepared by a precipitation polymerization process as in Example 1. On combining 1 gram of this copolymer with 250 mg. of aminopeptidase obtained from pig kidney microsomes in 0.2 M phosphate buffer at a pH of 7.5 at ice temperatures, and with further working up as in Example 6, 1.2 grams of an "aminopeptidase resin" were obtained.

EXAMPLE 8

100 g. of a polymer prepared and cross-linked according to Example 1 was stirred for 24 hours at ice temperatures in 20 ml. of 0.2 M phosphate buffer with 25 mg. of gamma-globulin from human serum and then further treated as in Example 6. Yield: 120 mg.

EXAMPLE 9

500 mg. of polymethacrylic acid anhydride prepared and cross-linked according to Example 1 was stirred in water for 24 hours at room temperature with 100 mg. of insulin obtained from the pancreas of cattle and then further worked up as in Example 6. Yield: 550 mg.

EXAMPLE 10

A copolymer comprising 15 percent by weight of methacrylic acid anhydride, 60 percent of N-methyl methacrylic acid amide, 10 percent of methacrylonitrile, 10 percent of vinyl acetate, and 5 percent of ethylene glycol dimethacrylate was prepared as a precipitation polymer as in Example 1. 100 mg. of this material were stirred for 24 hours at ice temperatures with 25 mg. of trypsin in 20 ml. of 0.2 M phosphate buffer and then further worked up as in Example 6. Yield: 105 mg.

EXAMPLE 11

Acrylic acid anhydride was polymerized in bulk for 36 hours at 60° C. after the addition thereto of 1 percent by weight of divinyl benzene and 0.1 percent of benzoyl peroxide. 1 g. of the polymer was dispersed in water together with 250 mg. of trypsin. The combination was stirred with ice cooling for 24 hours and lyophilized after addition of 1 gram of powdered cellulose. Yield: 1.9 g.

EXAMPLE 12

A copolymer comprising 45 percent by weight of acrylic acid anhydride, 50 percent of methacrylic acid anhydride, and 5 percent of ethylene glycol dimethylacrylate was prepared by a process like that described in the first paragraph of Example 1.

200 mg. of the material was stirred for 24 hours, with ice-cooling, in 40 ml. of 0.2 M phosphate buffer (pH 7.5) with 50 mg. of ribonuclease derived from the pancreas of cattle and then further treated as in Example 6. Yield: 230 mg.

What is claimed is:

1. A method for covalently bonding a proteinaceous biologically-active material having an alpha-amino or epsilon-amino group, said material being an enzyme, an enzyme inhibitor, an antigen, an antibody, or a hormonal polypeptide, to a polymeric carrier which is a water-insoluble polymer of acrylic acid anhydride or methacrylic acid anhydride free of dinitrofluorophenyl groups and prepared by a polymerization directly incorporating acrylic acid anhydride or methacrylic acid anhydride monomer units into the polymer, which method comprises contacting an aqueous solution of said proteinaceous material with said polymer at a temperature ranging from ice temperatures up to slightly elevated temperatures not harmful to said proteinaceous material, and then separating the liquid phase.

2. A method as in claim 1 wherein said water-insoluble polymer is a cross-linked homopolymer.

3. A method as in claim 2 wherein said homopolymer is cross-linked by reaction with a diamine or polyamine.

4. A method as in claim 1 wherein said water-insoluble polymer is a copolymer comprising at least 1 percent by weight of acrylic acid anhydride or methacrylic acid anhydride, the balance being a mono-unsaturated hydrophobic vinyl or vinylidene comonomer.

5. A method as in claim 4 wherein said copolymer is cross-linked by the presence therein of a further, different comonomer having at least two polymerizable carbon-carbon double bonds.

6. A water-insoluble biologically-active material prepared according to the method of claim 1.

7. A material as in claim 6 wherein said water-insoluble polymer is a cross-linked homopolymer.

8. A material as in claim 7 wherein said homopolymer is cross-linked by reaction with a diamine or polyamine.

9. A material as in claim 6 wherein said water-insoluble polymer is a copolymer comprising at least 1 percent by weight of acrylic acid anhydride or methacrylic acid anhydride, the balance being a mono-unsaturated hydrophobic vinyl or vinylidene comonomer.

10. A material as in claim 9 wherein said copolymer is cross-linked by the presence therein of a comonomer having at least two polymerizable carbon-carbon double bonds.

References Cited

UNITED STATES PATENTS

| | | | |
|---|---|---|---|
| 2,548,520 | 4/1951 | Damschroder et al. | 260—8 |
| 3,239,493 | 3/1966 | Hwa | 260—80 |
| 3,483,090 | 12/1969 | Barton | 195—66 |
| 3,282,702 | 11/1966 | Schreiner | 195—63 X |
| 3,630,841 | 12/1971 | Werle | 195—66 X |
| 3,502,545 | 3/1970 | Westman et al. | 195—66 |
| 3,616,229 | 10/1971 | Wildi et al. | 195—63 |
| 3,625,827 | 12/1971 | Wildi et al. | 195—63 |
| 3,627,640 | 12/1971 | Blumberg et al. | 195—63 |

FOREIGN PATENTS

| | | | |
|---|---|---|---|
| 1,149,517 | 5/1963 | Germany | 260—8 |

OTHER REFERENCES

Pure and Applied Chemistry, vol. 4, 1962, Manecke, pp. 507–509.

J. of Polymer Science, vol. 55, p. 197, Hwa et al., 1961.

J. of Polymer Science, vol. 2, part A, p. 2385, Hwa et al., 1964.

HOWARD E. SCHAIN, Primary Examiner

U.S. Cl. X.R.

195—68, Dig. 11; 260—8, 112 R; 424—81